(12) United States Patent
Valencia

(10) Patent No.: US 12,075,897 B2
(45) Date of Patent: Sep. 3, 2024

(54) LUMINESCENT MOBILE CASE DEVICE

(71) Applicant: Arthur Valencia, Goldthwaite, TX (US)

(72) Inventor: Arthur Valencia, Goldthwaite, TX (US)

( * ) Notice: Subject to any disclaimer, the term of this patent is extended or adjusted under 35 U.S.C. 154(b) by 291 days.

(21) Appl. No.: 17/827,877

(22) Filed: May 30, 2022

(65) Prior Publication Data
US 2023/0380563 A1    Nov. 30, 2023

(51) Int. Cl.
*A45C 15/06*    (2006.01)
*A45C 11/00*    (2006.01)
*H04M 1/02*    (2006.01)

(52) U.S. Cl.
CPC .............. *A45C 15/06* (2013.01); *A45C 11/00* (2013.01); *H04M 1/0202* (2013.01)

(58) Field of Classification Search
CPC ....... A45C 15/06; A45C 11/00; H04M 1/0202
USPC .......................................... 362/154, 84, 253
See application file for complete search history.

(56) References Cited

U.S. PATENT DOCUMENTS

| | | | |
|---|---|---|---|
| 8,840,744 B2 | 9/2014 | Antonini | |
| 9,017,575 B2 | 4/2015 | Sakaguchi | |
| 9,075,568 B1* | 7/2015 | Gray | G06F 3/0488 |
| 9,294,601 B2 | 3/2016 | Hammond | |
| D773,448 S | 12/2016 | Armillotti | |
| 9,992,884 B2 | 6/2018 | Williams | |
| 10,503,205 B2 | 12/2019 | Spevak | |
| 2009/0120980 A1 | 5/2009 | Calayo | |
| 2013/0260825 A1* | 10/2013 | Hagenstad | G08B 15/004 |
| | | | 455/556.1 |
| 2014/0055978 A1* | 2/2014 | Gantz | A45C 11/00 |
| | | | 362/458 |
| 2017/0145890 A1* | 5/2017 | Hill | F01N 3/0256 |
| 2020/0028950 A1* | 1/2020 | Mody | G06F 1/1626 |

FOREIGN PATENT DOCUMENTS

WO    WO2004050343    6/2004

* cited by examiner

*Primary Examiner* — Laura K Tso

(57) ABSTRACT

A luminescent mobile case device for imbedding a luminescent strip within the case includes a case having a back wall. The back wall has a top edge and a bottom edge. Additionally, the back wall has a right edge and a left edge. A top wall is positioned on the top edge of the back wall. A bottom wall is positioned parallel relative to the top wall. A left wall is positioned on the left edge of the back wall. A right wall is positioned parallel relative to the left wall. A front wall is positioned parallel relative to the back wall of the case. The front wall has a center cutout the screen of the mobile device. A luminescent strip is enwrapped upon the case. The luminescent strip emits light in a darkened environment from a phosphorescent pigment obtaining sunlight.

14 Claims, 5 Drawing Sheets

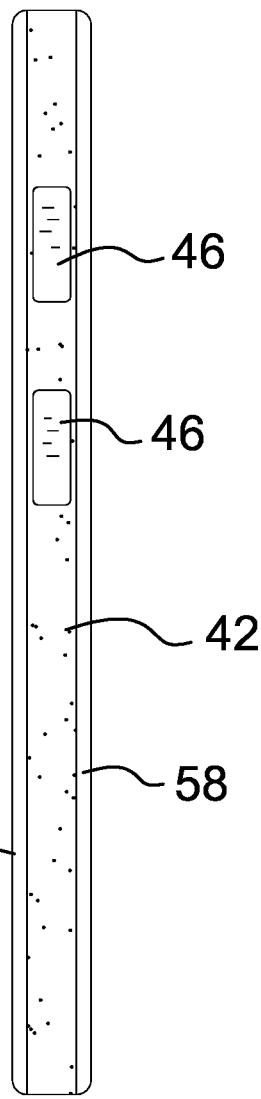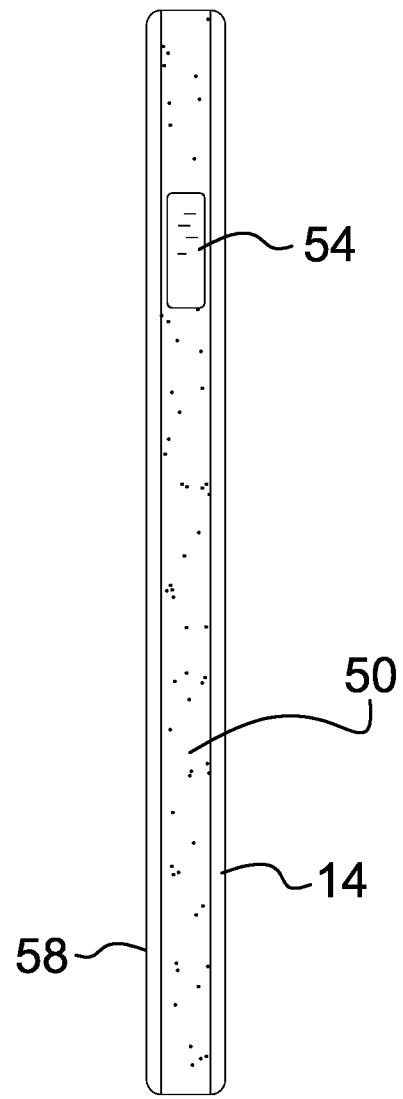
FIG. 4  FIG. 5
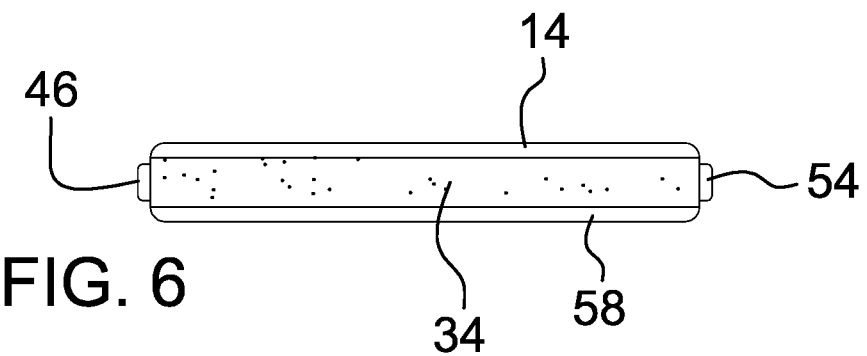
FIG. 6

LUMINESCENT MOBILE CASE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to illuminated case device and more particularly pertains to a new illuminated case device for imbedding a luminescent strip within the case.

(2) Description of Related Art Including Information Disclosed Under 37 CFR 1.97 and 1.98

The prior art relates to illuminated case device. The prior art relates to a variety of illuminated case devices configured for illuminating wherein indicating the location of a mobile device. Known prior art lacks an illuminated case device having a luminescent strip made of a phosphorescent pigment imbedded with the case.

BRIEF SUMMARY OF THE INVENTION

An embodiment of the disclosure meets the needs presented above by generally comprising a case having a back wall. The back wall has a top edge and a bottom edge. Additionally, the back wall has a right edge and a left edge. The back wall is configured for being positioned abutting a back surface of a mobile device. A top wall is positioned on the top edge of the back wall and protruding out from the top edge. A bottom wall is positioned parallel relative to the top wall. A left wall is positioned on the left edge of the back wall and protruding out from the left edge. A right wall is positioned parallel relative to the left wall. A front wall is positioned parallel relative to the back wall of the case. The front wall has a center cutout defining an area for the screen of the mobile device to be engaged with. A luminescent strip is enwrapped upon the case. The luminescent strip is positioned between the back wall and the front wall of the case. The luminescent strip is configured for emitting light in a darkened environment. Furthermore, the luminescent strip has a phosphorescent pigment being configured for obtaining sunlight prior to illuminating.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a left view of an embodiment of the disclosure.

FIG. 5 is a right view of an embodiment of the disclosure.

FIG. 6 is a top view of an embodiment of the disclosure.

DETAILED DESCRIPTION OF THE INVENTION

Figure 1:
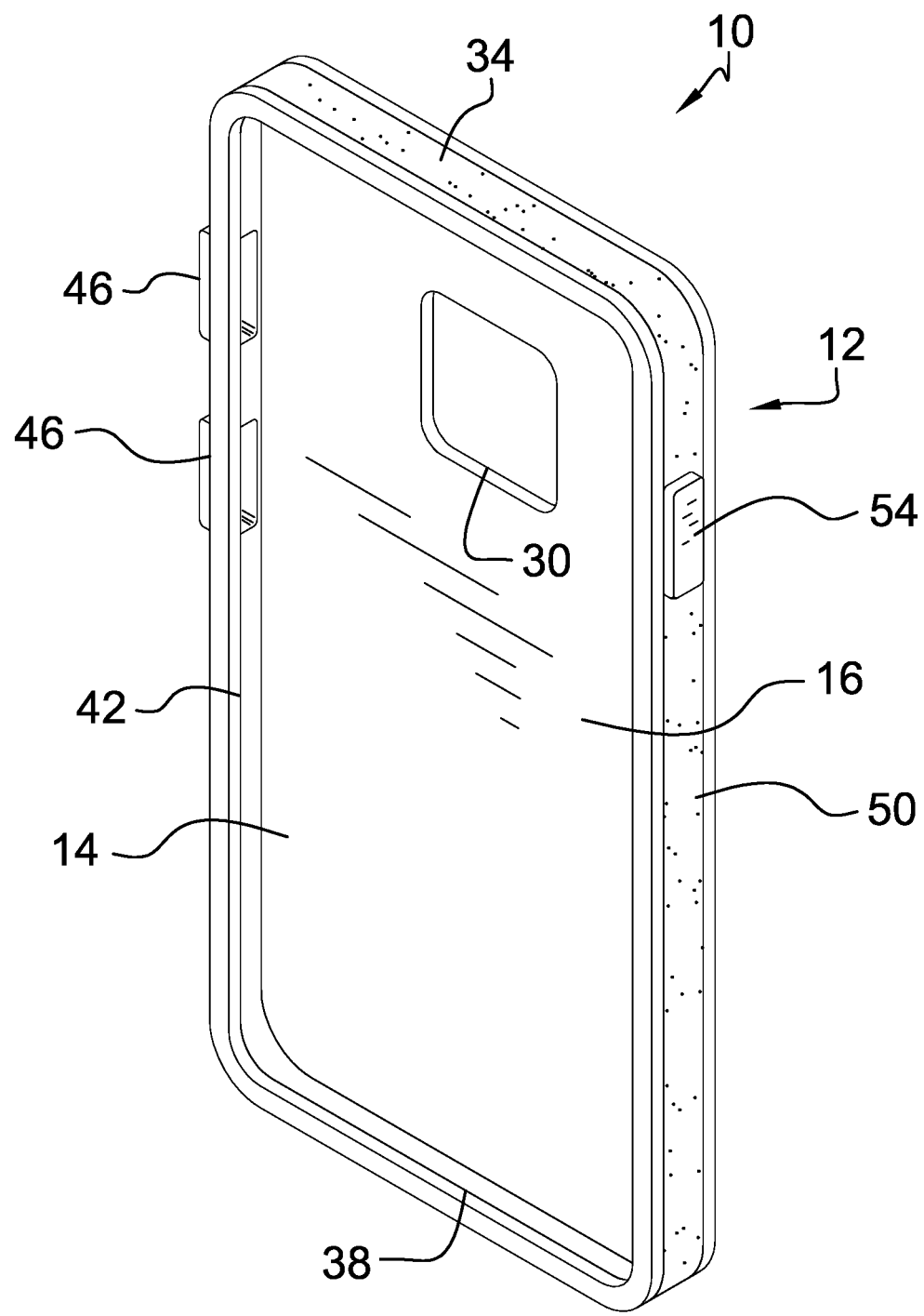
FIG. 1 is a top isometric view of a luminescent mobile case device according to an embodiment of the disclosure.
Figures 2, 3:
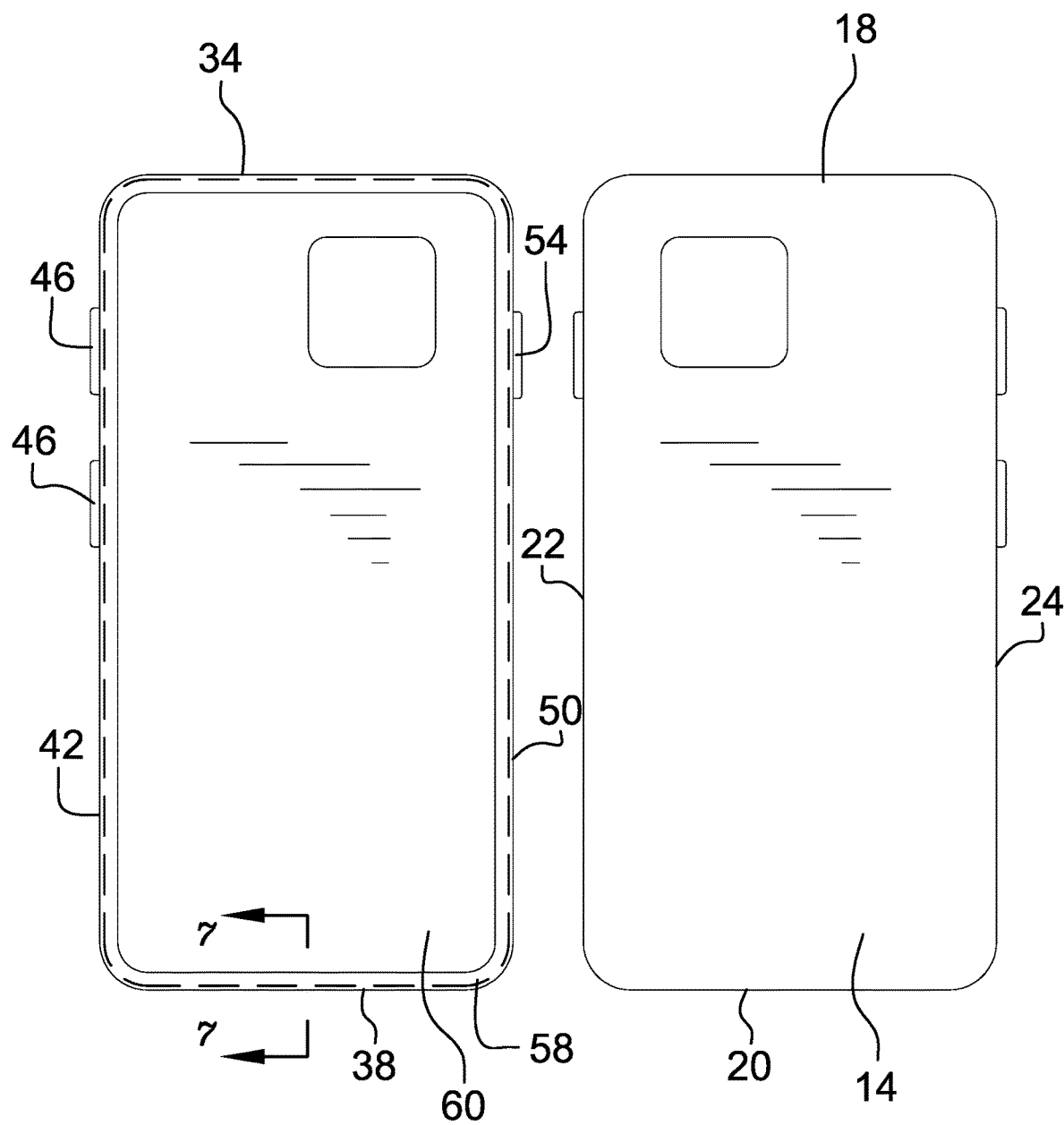
FIG. 2 is a front view of an embodiment of the disclosure.
FIG. 3 is a back view of an embodiment of the disclosure.
Figure 7:
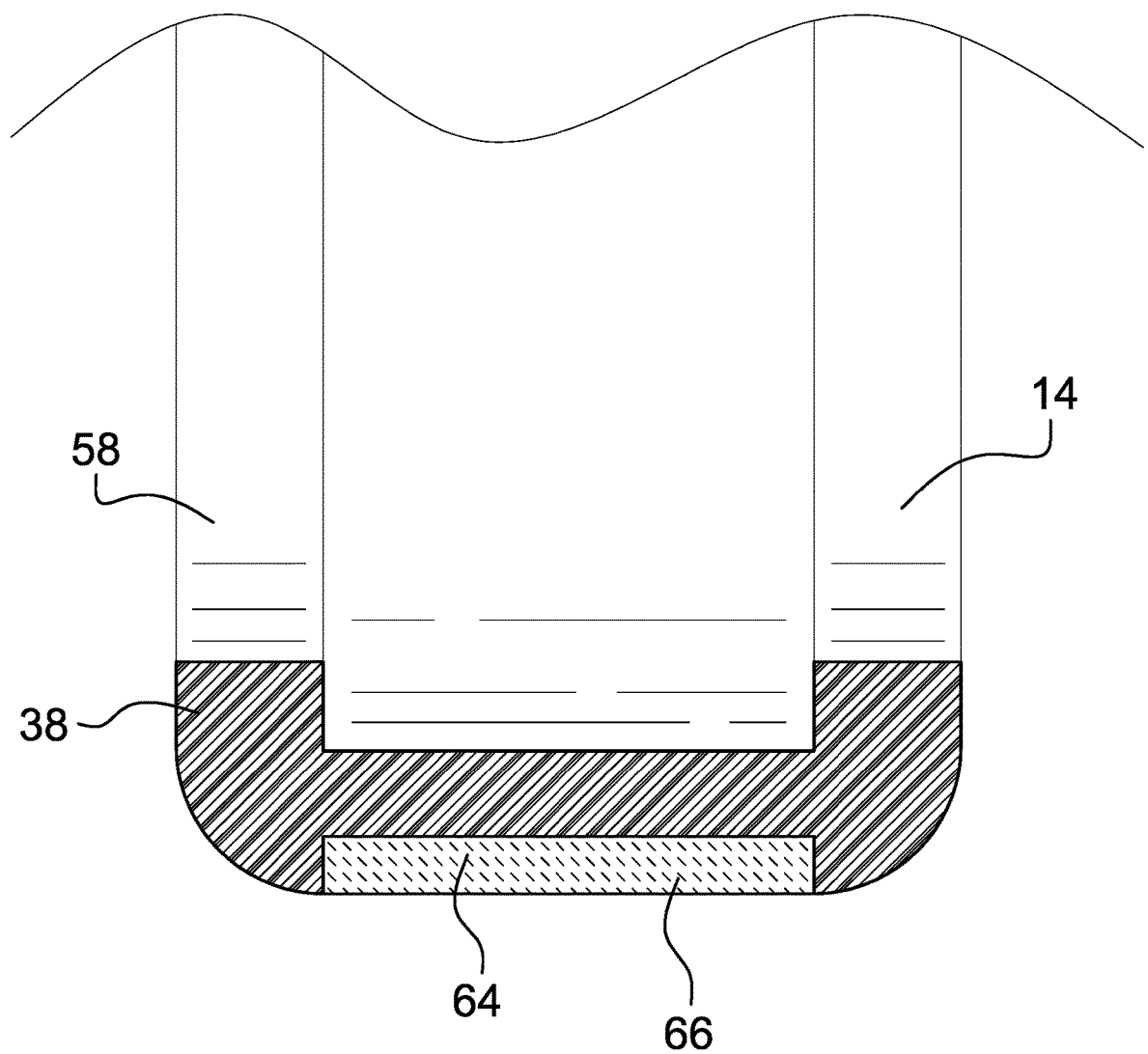
FIG. 7 is a cross-sectional view of an embodiment of the disclosure taken from FIG. 2 of Line 7-7.
Figure 8:
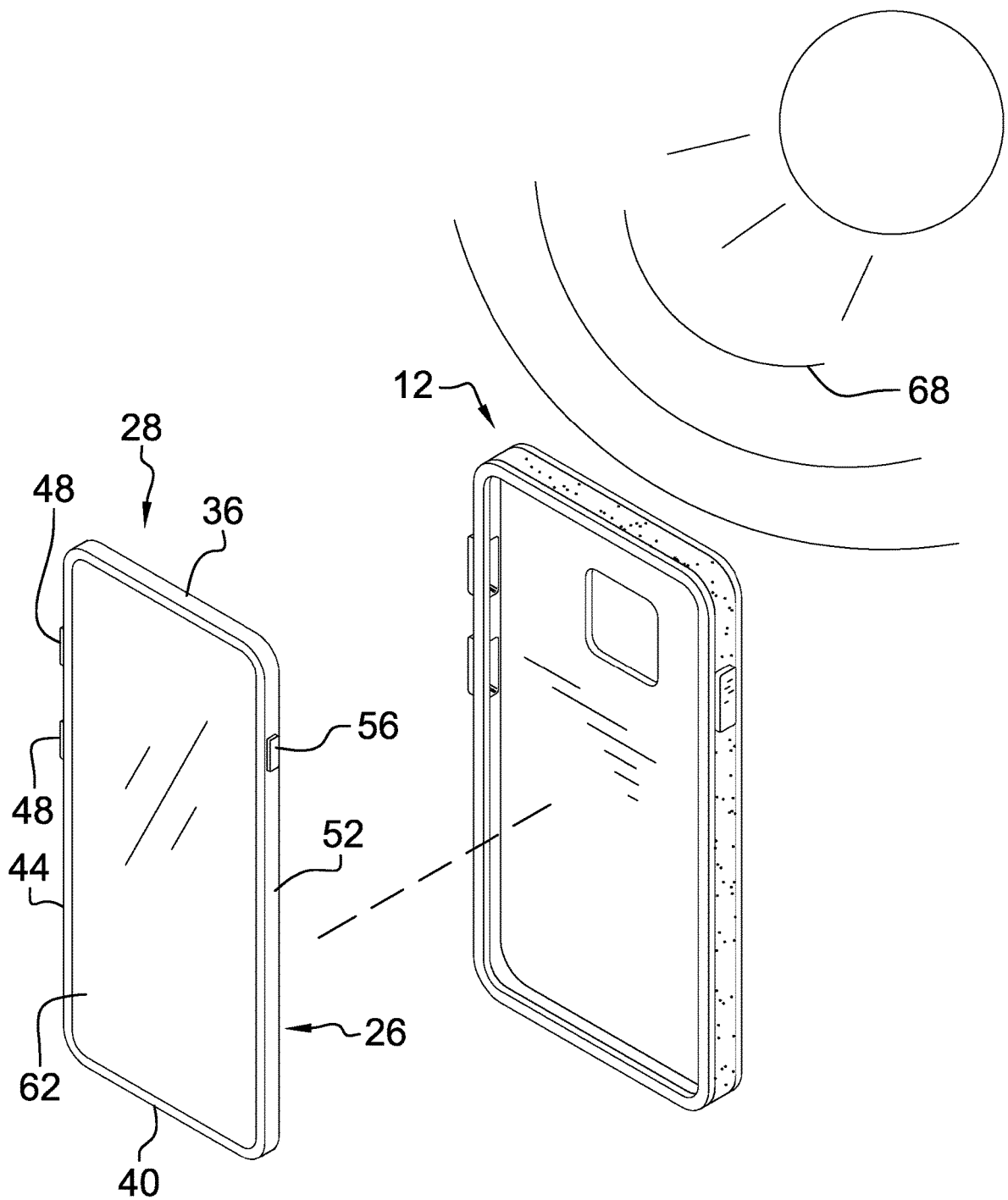
FIG. 8 is an exploded view of an embodiment of the disclosure.

With reference now to the drawings, and in particular to FIGS. 1 through 7 thereof, a new illuminated case device embodying the principles and concepts of an embodiment of the disclosure and generally designated by the reference numeral 10 will be described.

As best illustrated in FIGS. 1 through 7, the luminescent mobile case device 10 generally comprises a case 12 having a back wall 14. The case 12 is a durable material 16 configured for being resistant to damage from an outside force. The durable material 16 gives the case 12 the ability to be able to withstand damage from falling. The back wall 14 has a top edge 18 and a bottom edge 20. Additionally, the back wall 14 has a right edge 22 and a left edge 24. The top 18 and bottom 20 edges are positioned perpendicular relative to the right 22 and left 24 edges, wherein creating a rectangular shape for the back wall 14. The back wall 14 is configured for being positioned abutting a back surface 26 of a mobile device 28. Furthermore, the back wall 14 has an opening 30 defining a space for a camera lens 32 of the mobile device 28 to be positioned within.

A top wall 34 is positioned on the top edge 18 of the back wall 14 and protrudes out from the top edge 18. The top wall 34 is positioned perpendicular relative to the back wall 14, wherein the top wall 34 is configured for being positioned abutting a top surface 36 of the mobile device 28. Furthermore, a bottom wall 38 is positioned parallel relative to the top wall 34. The bottom wall 38 positioned on the bottom edge 20 of the back wall 14 and protrudes out from the bottom edge 20. The bottom wall 38 is configured for being positioned abutting a bottom surface 40 of the mobile device 28.

A left wall 42 is positioned on the left edge 24 of the back wall 14 and protrudes out from the left edge 24. The left wall 42 is positioned perpendicular relative to the back wall 14, wherein the left wall 42 is configured for being positioned abutting a left surface 44 of the mobile device 28. Furthermore, the left wall 42 has a pair of indents 46. The pair of indents 46 is configured for encasing a respective one of a pair of volume buttons 48 of the left surface 44 of the mobile device 28. The pair of indents 46 of the left wall 42 allows the user to engage with the pair of volume buttons 48 when the mobile device 28 is nested within the case 12.

A right wall 50 is positioned parallel relative to the left wall 42. The right wall 50 is positioned on the right edge 22 of the back wall 14 and protrudes out from the right edge 22. The right wall 50 is configured for abutting a right surface 52 of the mobile device 28. The right wall 50 has a concave 54, wherein the concave 54 is configured for encasing an actuator button 56 of the right surface 52 of the mobile device 28. The concave 54 of the right wall 50 allows the user to engage with the actuator button 56 when the mobile device 28 is nested within the case 12.

A front wall 58 is positioned parallel relative to the back wall 14 of the case 12. The front wall 58 is positioned upon the top wall 34 and the bottom wall 38. Furthermore, the front wall 58 is positioned upon the left wall 42 and the right wall 50, wherein the front wall 58 is positioned perpendicular relative to the top 34 and bottom 38 walls and the left 42 and right 50 walls. The front wall 58 has a center cutout 60 defining an area for the screen 62 of the mobile device 28 to be engaged with. Moreover, the front wall 58 is configured for assisting in restraining the mobile device 28 within the case 12, wherein the front wall 58 helps retain the screen 62 of the mobile device 28 within the case 12.

A luminescent strip 64 is enwrapped upon the case 12. The luminescent strip 64 is imbedded within the top wall 34 and the bottom wall 38. Furthermore, the luminescent strip 64 is imbedded within the left wall 42 and the right wall 50. The luminescent strip 64 is positioned between the back wall 14 and the front wall 58 of the case 12. The luminescent strip 64 is continuous wherein lacking a break in the luminescent strip 64. The luminescent strip 64 is configured for emitting light in a darkened environment, such as during night time. The luminescent strip 64 has a phosphorescent pigment 66 being configured for obtaining sunlight 68 prior to illuminating. The luminescent strip 64 is positioned within sunlight 68 or other artificial light prior to illuminating in the darkened environment.

In use, the mobile device 28 is positioned within the case 12. The screen 62 of the mobile device 28 is positioned abutting the front wall 58 with the center cutout 60 where the user can engage with the screen 62 of the mobile device 28. The luminescent strip 64 is configured for being exposed to sunlight 68 or other artificial light. Subsequently, the luminescent strip 64 is able to illuminate within a darkened environment, such as during night time or within a darkened room. The purpose of the case 12 is to be able to identify the location of the mobile device 28 when the environment is darkened.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A luminescent mobile case device configured for emitting light in a darkened environment, the luminescent mobile case device comprising:
    a case having a back wall, said back wall having a top edge and a bottom edge, said back wall having a right edge and a left edge, said back wall being configured for being positioned abutting a back surface of a mobile device;
    a top wall being positioned on said top edge of said back wall and protruding out from said top edge;
    a bottom wall being positioned parallel relative to said top wall;
    a left wall being positioned on said left edge of said back wall and protruding out from said left edge;
    a right wall being positioned parallel relative to said left wall;
    a front wall being positioned parallel relative to said back wall of said case, said front wall having a center cutout, said center cutout defining an area for the screen of the mobile device to be engaged with; and
    a luminescent strip being enwrapped upon said case, said luminescent strip being positioned between said back wall and said front wall of said case, said luminescent strip being configured for emitting light in a darkened environment, said luminescent strip having a phosphorescent pigment, said phosphorescent pigment being configured for obtaining sunlight prior to illuminating.

2. The luminescent mobile case device of claim 1, further comprising said case being a durable material, said durable material being configured for being resistant to damage from an outside force.

3. The luminescent mobile case device of claim 1, further comprising said top and bottom edges being positioned perpendicular relative to said right and left edges, said back wall having a rectangular shape.

4. The luminescent mobile case device of claim 1, further comprising said back wall having an opening, said opening defining a space for a camera lens of the mobile device to be positioned within.

5. The luminescent mobile case device of claim 3, further comprising said top wall being positioned perpendicular relative to said back wall, said top wall being configured for being positioned abutting a top surface of the mobile device.

6. The luminescent mobile case device of claim 5, further comprising said bottom wall positioned on said bottom edge of said back wall and protruding out from said bottom edge, said bottom wall being configured for being positioned abutting a bottom surface of the mobile device.

7. The luminescent mobile case device of claim 6, further comprising said left wall being positioned perpendicular relative to said back wall, said left wall being configured for being positioned abutting a left surface of the mobile device.

8. The luminescent mobile case device of claim 7, further comprising said left wall having a pair of indents, said pair of indents being configured for encasing a respective one of a pair of volume buttons of the left surface of the mobile device.

9. The luminescent mobile case device of claim 8, further comprising said right wall being positioned on said right edge of said back wall and protruding out from said right edge, said right wall being configured for abutting a right surface of the mobile device.

10. The luminescent mobile case device of claim 9, further comprising said right wall having a concave, said concave being configured for encasing an actuator button of the right surface of the mobile device.

11. The luminescent mobile case device of claim 10, further comprising said front wall being positioned upon said top wall and said bottom wall, said front wall being positioned upon said left wall and said right wall.

12. The luminescent mobile case device of claim 11, further comprising said front wall being configured for assisting in retaining the mobile device within said case.

13. The luminescent mobile case device of claim 12, further comprising said luminescent strip being imbedded within said top wall and said bottom wall, said luminescent strip being imbedding within said left wall and said right wall.

14. A luminescent mobile case device configured for emitting light in a darkened environment, the luminescent mobile case device comprising:
- a case having a back wall, said case being a durable material, said durable material being configured for being resistant to damage from an outside force, said back wall having a top edge and a bottom edge, said back wall having a right edge and a left edge, said top and bottom edges being positioned perpendicular relative to said right and left edges, said back wall having a rectangular shape, said back wall being configured for being positioned abutting a back surface of a mobile device, said back wall having an opening, said opening defining a space for a camera lens of the mobile device to be positioned within;
- a top wall being positioned on said top edge of said back wall and protruding out from said top edge, said top wall being positioned perpendicular relative to said back wall, said top wall being configured for being positioned abutting a top surface of the mobile device;
- a bottom wall being positioned parallel relative to said top wall, said bottom wall positioned on said bottom edge of said back wall and protruding out from said bottom edge, said bottom wall being configured for being positioned abutting a bottom surface of the mobile device;
- a left wall being positioned on said left edge of said back wall and protruding out from said left edge, said left wall being positioned perpendicular relative to said back wall, said left wall being configured for being positioned abutting a left surface of the mobile device, said left wall having a pair of indents, said pair of indents being configured for encasing a respective one of a pair of volume buttons of the left surface of the mobile device;
- a right wall being positioned parallel relative to said left wall, said right wall being positioned on said right edge of said back wall and protruding out from said right edge, said right wall being configured for abutting a right surface of the mobile device, said right wall having a concave, said concave being configured for encasing an actuator button of the right surface of the mobile device;
- a front wall being positioned parallel relative to said back wall of said case, said front wall being positioned upon said top wall and said bottom wall, said front wall being positioned upon said left wall and said right wall, said front wall having a center cutout, said center cutout defining an area for the screen of the mobile device to be engaged with, said front wall being configured for assisting in retaining the mobile device within said case; and
- a luminescent strip being enwrapped upon said case, said luminescent strip being imbedded within said top wall and said bottom wall, said luminescent strip being imbedding within said left wall and said right wall, said luminescent strip being positioned between said back wall and said front wall of said case, said luminescent strip being configured for emitting light in a darkened environment said luminescent strip having a phosphorescent pigment, said phosphorescent pigment being configured for obtaining sunlight prior to illuminating.

* * * * *